Dec. 21, 1937.  G. A. PETREMONT  2,102,971
PACKAGING CANDY
Filed March 20, 1935
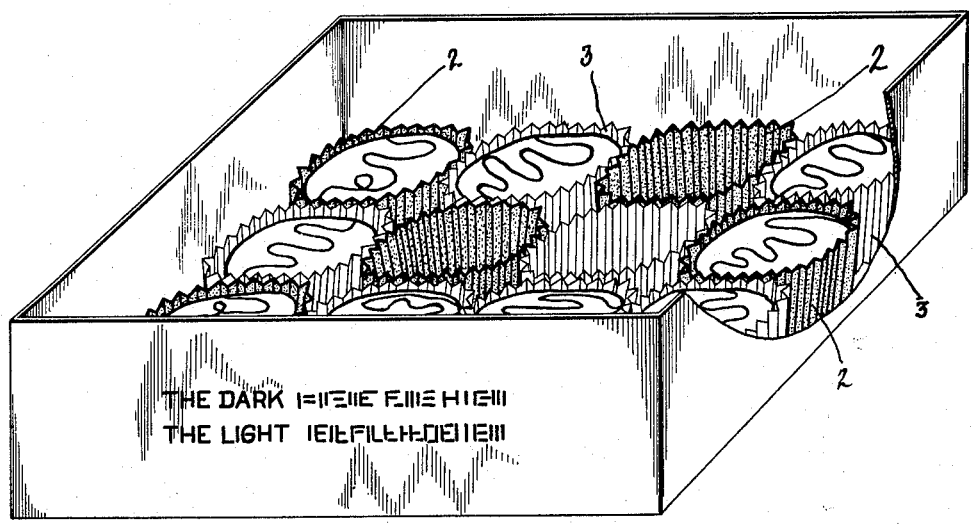
INVENTOR
Gordon A. Petremont
BY E. C. Sanborn
ATTORNEY Patented Dec. 21, 1937

2,102,971

UNITED STATES PATENT OFFICE 2,102,971

PACKAGING CANDY

Gordon A. Petremont, Boston, Mass., assignor to The Gobelin Company, Inc., Cambridge, Mass., a corporation of Massachusetts Application March 20, 1935, Serial No. 11,995

2 Claims. (Cl. 99—180)

This invention relates to a novel package of candy and to the method of preparing the same. It has been the practice, heretofore, in the art of packaging coated candies as chocolates and the like to box the same in one or more layers, the pieces resting in individual cups. This is done to prevent damage in shipment, sticking together, and in general to make the candy more attractive and capable of being more easily handled.

With a coating on the candy, it is difficult for the customer to know with certainty the composition of the center without trying it. Heretofore, this difficulty has been overcome, in part, by shaping the various pieces to indicate the type of center. This, however, is not completely reliable and involves extra expense and operations, in making up the various pieces.

An object of my invention is the utilization of the cup containing the candy to indicate the nature of its center.

The figure of the drawing is a perspective view of a box of chocolates in accordance with my invention.

This object may be accomplished, for example as illustrated in the drawing, by using dark cups 2 for the hard centers and light cups 3 for the soft centers, or various colored cups may be used to indicate any suitable center material. Such selective cups may be made of any suitable material, such as paper and may be manufactured and applied to the candy in the conventional manner or in any other way. By this device the necessity of shaping the candy to indicate its interior is eliminated, although, of course, candy in its usual forms and shapes may also be packaged in this manner. By my invention, the cost of the candy making process is lowered and at the same time the purchaser is apprised at a glance and with certainty of the internal character of the pieces. There is no need to take into account differing shapes or sizes or to conjecture as to the nature of the interior of any piece. Its character is obvious from a mere glance at the colored cup in which it rests.

My invention may be incorporated in the usual candy package without additional expense. It is obvious, of course, that no extra machinery or operations are required in using my colored cups. One of the chief advantages of my invention is its very simplicity and the ease by which it may be adapted to the candy art.

The principle of the invention may of course be further carried out in numerous other ways: for example, brown cups might indicate nougatines; blue cups, Italian creams; red cups, chocolate almonds; and green cups, chocolate caramels.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A package of chocolates comprising a container containing chocolates with different centers, individual cups in contact with each other holding said chocolates, said cups being of different colors and holding different centered chocolates which centers are identified by the color of the cup, and means associated with said container for indicating the relation of the colors of said cups to the nature of the centers of said chocolates held thereby.

2. A package of chocolates comprising a container containing different centered chocolates therein, individual light colored and dark colored cups adjacent each other holding said chocolates, chocolates of one type of center being placed in the light colored cups and chocolates of another type of center being placed in the dark colored cups, and means associated with the container for indicating the relation of said light and dark colored cups to the nature of the centers of the chocolates held thereby.

GORDON A. PETREMONT.